US008584371B2

(12) United States Patent
Marumoto et al.

(10) Patent No.: US 8,584,371 B2
(45) Date of Patent: Nov. 19, 2013

(54) PAPER SIZE DETECTING MECHANISM AND IMAGE FORMING APPARATUS PROVIDED THEREWITH

(75) Inventors: Takeshi Marumoto, Osaka (JP); Kazuhisa Hirahara, Osaka (JP); Shinichi Kotera, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 249 days.

(21) Appl. No.: 13/233,077

(22) Filed: Sep. 15, 2011

(65) Prior Publication Data

US 2012/0117814 A1 May 17, 2012

(51) Int. Cl.
*G01B 5/02* (2006.01)
*B65H 7/02* (2006.01)
*B41J 13/10* (2006.01)

(52) U.S. Cl.
USPC .............. 33/555; 33/623; 399/370; 271/3.13; 271/9.06; 355/72

(58) Field of Classification Search
USPC ........ 33/623, 783, 784, 679.1, 549, 555, 556, 33/558; 399/370, 376; 271/239, 3.13, 271/9.06; 355/75, 72
See application file for complete search history.

(56) References Cited

U.S. PATENT DOCUMENTS 4,505,575 A * 3/1985 Palumbo ........................ 399/189
4,541,713 A * 9/1985 Maekawa ........................ 355/75
4,814,833 A * 3/1989 Matsushita et al. ............. 355/75
4,857,969 A * 8/1989 Okada ............................. 355/72
5,018,718 A * 5/1991 Matsuno et al. .............. 271/245
5,172,178 A * 12/1992 Oushiden et al. ............... 399/86
5,483,889 A * 1/1996 Hoberock et al. ............ 101/232
5,960,553 A * 10/1999 Ishii et al. ....................... 33/556
5,988,621 A * 11/1999 Kondo et al. ................ 271/3.02
6,070,048 A * 5/2000 Nonaka et al. ................ 399/376
7,615,768 B2 * 11/2009 Yamada ................... 250/559.36
8,264,669 B2 * 9/2012 Shibazaki ....................... 355/72
2011/0243577 A1 * 10/2011 Marumoto ........................ 399/2

FOREIGN PATENT DOCUMENTS

JP 7-251951 10/1995
JP 2004-250113 9/2004

* cited by examiner

*Primary Examiner* — Christopher Fulton

(74) *Attorney, Agent, or Firm* — Smith, Gambrell & Russell, LLP

(57) ABSTRACT

A detecting member 35 has three substantially rectangular plate-shaped detecting plates 51*a*, 51*b*, and 51*c* formed integrally therewith which are arranged to face an arc-shaped portion 33*a* of a following member 33. The detecting plates 51*a*, 51*b*, and 51*c* are, at one end, supported on a main portion 50, and are composed of base-end portions R1, with which, at their reverse side, a prop 60 makes contact, and swing portions R2, which are located on the tip-end side of the base-end portions R1 and with which protrusions 43*a* and 43*b* on the arc-shaped portion 33*a* make contact. The base-end portions R1 have a wider elastically deformable range than the swing portions R2.

11 Claims, 10 Drawing Sheets

PAPER SIZE DETECTING MECHANISM AND IMAGE FORMING APPARATUS PROVIDED THEREWITH

This application is based on Japanese Patent Application No. 2010-252466 filed on Nov. 11, 2010 and Japanese Patent Application No. 2011-23475 filed on Feb. 7, 2011, the contents of both of which are hereby incorporated by reference.

BACKGROUND OF THE INVENTION

1. Field of the Invention

The present invention relates to a paper size detecting mechanism for detecting the size of paper (sheets of paper) stacked in a paper feed cassette unloadably loaded in an image forming apparatus, and to an image forming apparatus provided with such a paper size detecting mechanism. More particularly, the present invention relates to a paper size detecting mechanism that has a simple structure, that requires a reduced installation space, and that can prevent erroneous detection.

2. Description of Related Art

Image forming apparatus such as copiers, printers, facsimile machines, and the like are unloadably loaded with paper feed cassettes in which paper of different sizes can be appropriately stacked. An image forming apparatus loaded with such paper feed cassettes is designed to be capable of automatically detecting the size of the stacked paper.

In one typical example of a known paper size detecting mechanism, there is provided a switch that detects the position of a pressing member that, when paper is stacked in a paper feed cassette, is pressed against an edge of the paper to detect its position. Inconveniently, however, this detection mechanism requires as many switches as there are different sizes of paper and thus requires an increased number of components. Moreover, providing many switches requires an accordingly large space. This hampers the miniaturization of image forming apparatus.

As a solution to the above problem, there is known, for example, a paper size detecting mechanism that uses less switches and instead detects the paper size based on the combination of the on and off states of those switches. This improved paper size detecting mechanism is provided with—in the cabinet of an image forming apparatus—three push switches and—on a paper feed cassette—a segment gear which rotates in concert with a pressing member, and has cogs formed at its circumferential edge; an idle gear which is rotated by the segment gear; and a partly cut member which has a rack meshing with the idle gear, moves as the segment gear rotates, and has a recess and a protrusion that, when the paper feed cassette is loaded in the image forming apparatus, selectively press the switches to turn them on or off.

Inconveniently, however, the above paper size detecting mechanism requires gears, such as a segment gear, an idle gear, and a rack, and in addition a plurality of (three) independent switches. Thus, the mechanism is complicated and costly.

In another known paper size detecting mechanism, there are provided—on a paper feed cassette—a movable pressing member which is pressed against stacked paper; and a following member which swings in concert with the pressing member, and has one or more protrusions in a tip-end portion thereof in the loading direction of the paper feed cassette, and—in an image forming apparatus—a detecting member which has a detecting plate that elastically deforms when any of the protrusions on the following member makes contact with it; and a multiple switch which is operated by the action of the detecting plate. With this design, the use of a single multiple switch, which is compact and inexpensive, instead of a plurality of independent switches and the provision of a detecting member of an elastic material between the paper feed cassette and the switch helps simplify the mechanism and thus helps achieve space saving and cost reduction.

Inconveniently, however, with the above design, the detecting member is a plate-shaped member made of resin, and the elasticity of the resin is exploited to restore the plate-shaped member from the position (on position) where it presses a contact of the multiple switch to the position (off position) where it ceases to do so.

Thus, depending on the degree and frequency of deformation, the detecting member may go beyond the limit within which it can restore from elastic deformation and undergo creep deformation (plastic deformation). The detecting member then fails to completely restore from the on position to the off position and causes erroneous detection.

SUMMARY OF THE INVENTION

To overcome the inconveniences mentioned above, an object of the present invention is to provide a paper size detecting mechanism that can effectively prevent erroneous detection of paper size through suppression of creep deformation of a detecting member, and to provide an image forming apparatus provided with such a paper size detecting mechanism.

To achieve the above object, according to one aspect of the present invention, a paper size detecting mechanism is provided with: a restricting member which is reciprocably provided on the inside of the bottom of a paper feed cassette unloadably loaded in the cabinet of an image forming apparatus and which restricts an edge of paper accommodated in the paper feed cassette; a following member including a following arm portion of which one end is coupled to the restricting member and an arc-shaped portion which is continuous with the other end of the following arm portion and which has formed thereon at least one protrusion protruding in the radial direction, the following member being provided swingable in concert with the movement of the restricting member; a detecting member which is arranged in the cabinet of the image forming apparatus at a position facing the arc-shaped portion and which has a plurality of detecting plates elastically deformable by contact with the protrusion, the detecting plates each including a base-end portion of which one end is supported on the main portion of the detecting member and a swing portion which is located on the tip-end side of the base-end portion and with which the protrusion makes contact, the base-end portion in at least one of the detecting plates having a wider elastically deformable range than the swing portion; a multiple switch which is provided on the rear side of the detecting member and which has a plurality of contacts switchable between an on state and an off state by elastic deformation of the plurality of detecting plates; and a prop which is provided horizontally over the multiple switch and which is kept in contact with the reverse side of the detecting plates, at the base-end portion thereof, to serve as a fulcrum of swinging, the paper size detecting mechanism detecting the size of the paper accommodated in the paper feed cassette.

The further objects of the present invention, and the specific benefits of the present invention, will be clear from the following description of embodiments of the present invention.

DETAILED DESCRIPTION OF PREFERRED EMBODIMENTS

Figure 1:
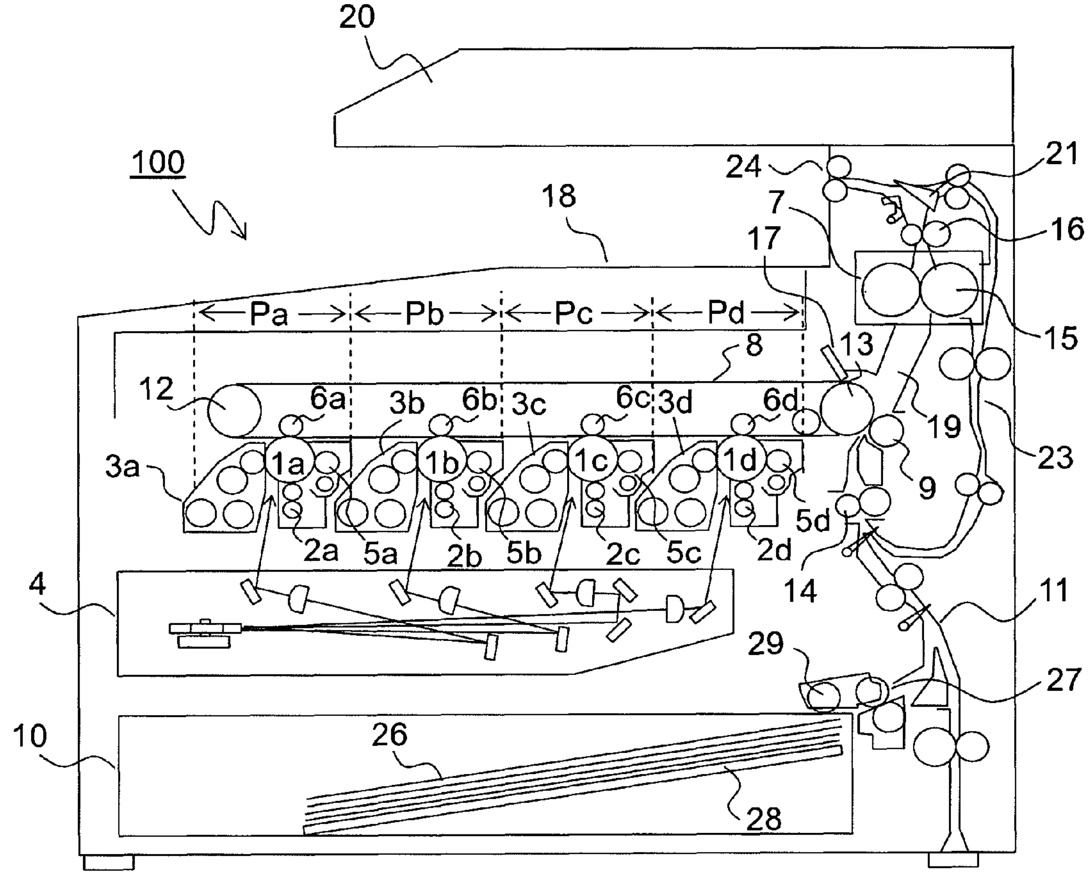
FIG. 1 is a schematic diagram showing an internal construction of an image forming apparatus provided with a paper size detecting mechanism according to the present invention.

Hereinafter, an embodiment of the present invention will be described with reference to the accompanying drawings. FIG. 1 is a schematic diagram showing the internal construction of an image forming apparatus provided with a paper size detecting mechanism according to the present invention. The image forming apparatus 100 is a tandem-type color copier, and inside the cabinet of the image forming apparatus 100, there are arranged four image forming sections Pa, Pb, Pc, and Pd in this order from left to right in FIG. 1. The image forming sections Pa, Pb, Pc, and Pd correspond to images of four different colors (yellow, magenta, cyan, and black), and form a yellow, a magenta, a cyan, and a black image sequentially, each through the processes of charging, exposure, development, and transfer.

In the image forming sections Pa, Pb, Pc, and Pd, photoconductive drums 1*a*, 1*b*, 1*c*, and 1*d* are respectively arranged which carry visible images (toner images) of the different colors. In addition, an intermediary transfer belt 8 which is rotated counter-clockwise in FIG. 1 is provided adjacent to the image forming sections Pa to Pd. The toner images formed on the photoconductive drums 1*a* to 1*d* are sequentially transferred onto the intermediary transfer belt 8, which moves while in contact with the photoconductive drums 1*a* to 1*d*, so as to be superimposed on one another, and are thereafter transferred onto paper P, as an example of a recording medium, by the action of a secondary transfer roller 9. The images are then fixed on the paper P in a fixing unit 7, and the paper P is thereafter ejected out of the apparatus cabinet. While the photoconductive drums 1*a* to 1*d* are rotated clockwise in FIG. 1, an image forming process is performed with respect to each of them.

Paper 26 onto which the toner images are to be transferred is accommodated in a paper feed cassette 10 in a lower part of the apparatus. The paper 26 is stacked on a paper stack plate 28 in the paper feed cassette 10. Pressing a pick-up roller 29 against the top face of the paper 26 under a predetermined pressure and rotating the pick-up roller 29 starts the feeding of the paper 26. A pair of paper feed rollers 27 separates the topmost sheet out of the plurality of sheets of paper 26 and transports it toward a paper transport passage 11. Having passed through the paper transport passage 11, the paper 26 reaches a pair of resist rollers 14, and is transported, with proper timing for image formation, to the nip between a secondary transfer roller 9 and a driver roller 13 of the intermediary transfer belt 8, which will be described later.

As the intermediary transfer belt 8, a sheet of a dielectric resin is used; used here is an endless belt formed by bonding together opposite ends of such a sheet with an overlap, or a seamless belt with no seam. On the downstream side of the secondary transfer roller 9 with respect to the movement direction of the intermediary transfer belt 8, there is arranged a cleaning blade 17 for removing the toner remaining on the surface of the intermediary transfer belt 8.

An image reading section 20 is composed of (though none of these is illustrated): a scanning optical system including a scanner lamp which illuminates a document during its copying and a mirror which changes the optical path of the light reflected from the document; a condenser lens which condenses and thereby focuses the light reflected from the document; a CCD sensor which converts the focused image light into an electrical signal; etc. The image reading section 20 reads an image of the document and converts it into image data.

Next, the image forming sections Pa to Pd will be described. Around and under the photoconductive drums 1*a* to 1*d* which are rotatably arranged, there are arranged: chargers 2*a*, 2*b*, 2*c*, and 2*d* for electrically charging the photoconductive drums 1*a* to 1*d*; an exposure unit 4 for exposing the photoconductive drums 1*a* to 1*d* to light conveying image information; developing units 3*a*, 3*b*, 3*c*, and 3*d* for forming toner images on the photoconductive drums la to 1*d*; and cleaning devices 5*a*, 5*b*, 5*c*, and 5*d* for removing the developer (toner) remaining on the photoconductive drums 1*a* to 1*d*.

When image data is fed in from the image reading section 20, first, the chargers 2*a* to 2*d* electrically charge the surfaces of the photoconductive drums 1*a* to 1*d* uniformly; next, the exposure unit 4 emits a light beam according to image data to form electrostatic latent images on the photoconductive drums 1*a* to 1*d* according to the image data from the image reading section 20. The developing units 3*a* to 3*d* are provided with developing rollers (developer carrying members) arranged opposite the photoconductive drums 1*a* to 1*d*, and are filled with predetermined amounts of two-component developer containing cyan, magenta, yellow, and black toner respectively. By the developing rollers of the developing units 3*a* to 3*d*, the toner is supplied onto the photoconductive drums 1*a* to 1*d* so as to electrostatically adhere thereto, thus forming toner images according to the electrostatic latent images formed through exposure to light from the exposure unit 4.

Then, primary transfer rollers 6*a* to 6*d* apply an electric field with a predetermined transfer voltage between the primary transfer rollers 6*a* to 6*d* and the photoconductive drums 1*a* to 1*d*, and thereby the cyan, magenta, yellow, and black toner images on the photoconductive drums 1*a* to 1*d* are primarily transferred onto the intermediary transfer belt 8. These images of four colors are formed in a predetermined positional relationship prescribed for formation of a predetermined full-color image. Thereafter, in preparation for formation of new electrostatic latent images to be formed subsequently, the toner remaining on the surfaces of the photoconductive drums 1*a* to 1*d* is removed by the cleaning devices 5*a* to 5*d*.

The intermediary transfer belt 8 is wound around and between a follow roller 12 and a drive roller 13. When a belt driving motor (not illustrated) starts to rotate the drive roller 13, the intermediary transfer belt 8 starts to rotate counterclockwise. The paper 26 is then transported from the pair of resist rollers 14 to the nip portion (secondary transfer nip portion) between the intermediary transfer belt 8 and the secondary transfer roller 9 arranged adjacent thereto with predetermined timing, so that, at the nip portion, the full-color toner image is transferred onto the paper 26. Having the toner images transferred onto it, the paper 26 is then transported to the fixing unit 7.

The paper 26 transported to the fixing unit 7 then, while passing through the nip (fixing nip portion) of a pair of fixing rollers 15, has heat and pressure applied to it so that the toner images are fixed on the surface of the paper 26 and thus the predetermined full-color image is formed. Having the full-color image formed thereon, the paper 26 is then directed into a desired transport direction by a transport guide member 21 arranged at a branching portion in a paper transport passage 19. The paper 26 is then, as it is (or after having been transported into a reversing transport passage 23 and subjected to double-side copying), ejected into an ejection tray 18 through a pair of ejection rollers 24.

Specifically, on the downstream side of the fixing rollers 15, the paper transport passage 19 branches into two, left and right, passages, one passage (the one branching to the left in FIG. 1) leading to the ejection tray 18. The other passage (the one branching to the right in FIG. 1) leads to the reversing transport passage 23.

Figure 2:
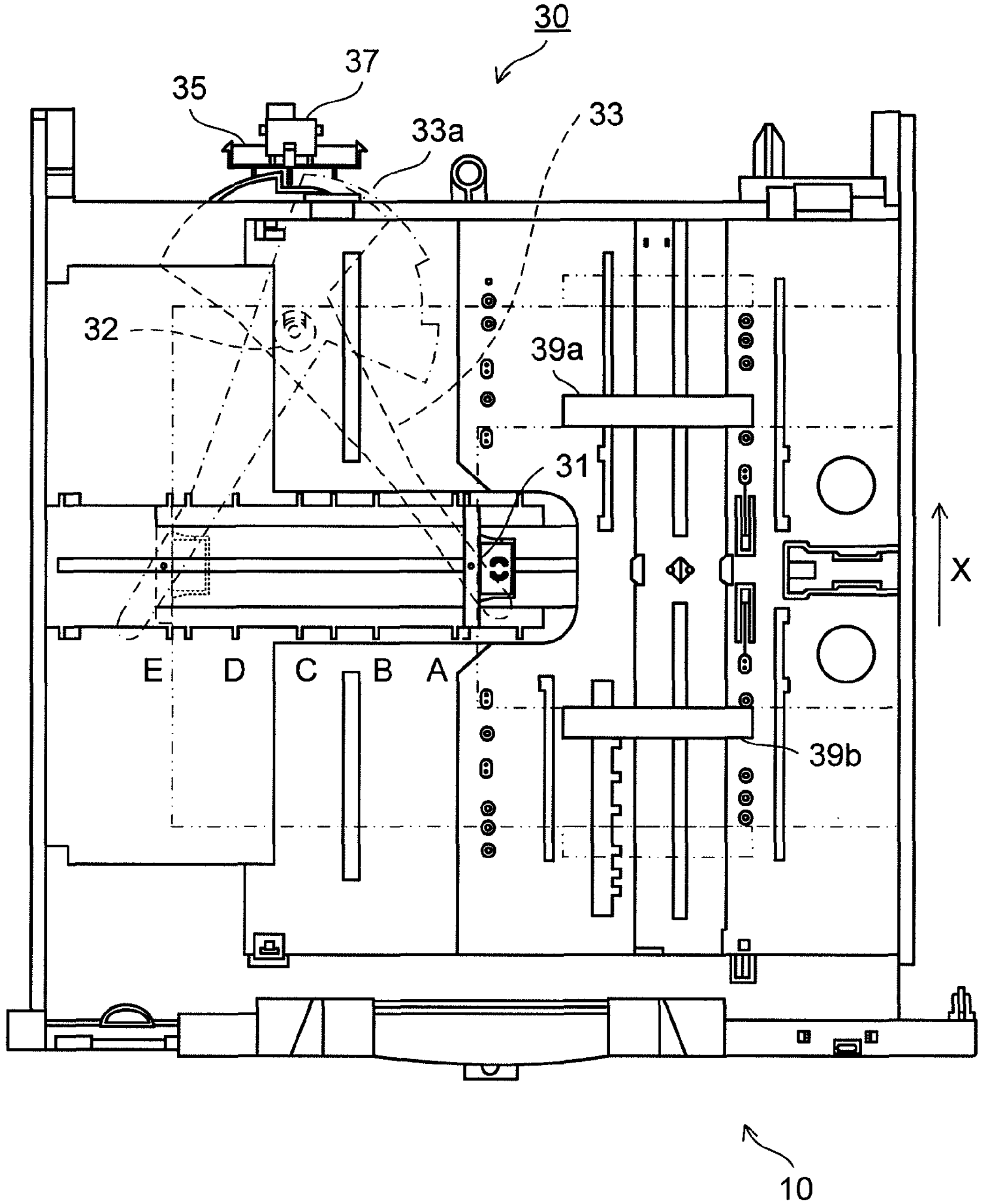
FIG. 2 is a plan view of a paper feed cassette provided with a paper size detecting mechanism according to the present invention, as seen from above the paper stack portion.

Next, the paper size detecting mechanism will be described. FIG. 2 is a plan view of the paper feed cassette 10 as seen from above the paper stack portion on its top side. The paper size detecting mechanism 30 is provided with: a trailing edge restricting member 31 which is reciprocably provided on the paper feed cassette 10, and restricts the trailing edge of stacked paper 26 by being located at a position corresponding to the paper size; and a following member 33 which is provided so as to be swingable about a swing center 32 in concert with the movement of the trailing edge restricting member 31, and has a fan-shaped, arc-shaped portion 40 in a tip-end portion thereof in the loading direction of the paper feed cassette 10 indicated by arrow X. The paper size detecting mechanism 30 is further provided with, in the cabinet (FIG. 1) of the image forming apparatus 100 in which the paper feed cassette 10 is unloadably loaded, at a position opposite an outer circumferential portion 33*a* of the arc-shaped portion 40 of the following member 33 fitted: a detecting member 35 which detects contact with the arc-shaped portion 40; and a multiple switch 37 which is operated by the action of the detecting member 35. As viewed in FIG. 1, the paper feed cassette 10 is loaded into the cabinet of the image forming apparatus 100 from the obverse to the reverse side of the page.

Except for the paper size detecting mechanism 30, the paper feed cassette 10 involves no novel feature of the present invention; thus, the paper feed cassette 10 itself may be of any known design. Accordingly, no description will be given except for the paper size detecting mechanism 30. In a known paper feed cassette 10, paper 26 of a selected size is stacked in a state positioned by a pair of movably provided width restricting members 39*a* and 39*b* and the above-mentioned trailing edge restricting member 31.

Figure 3:
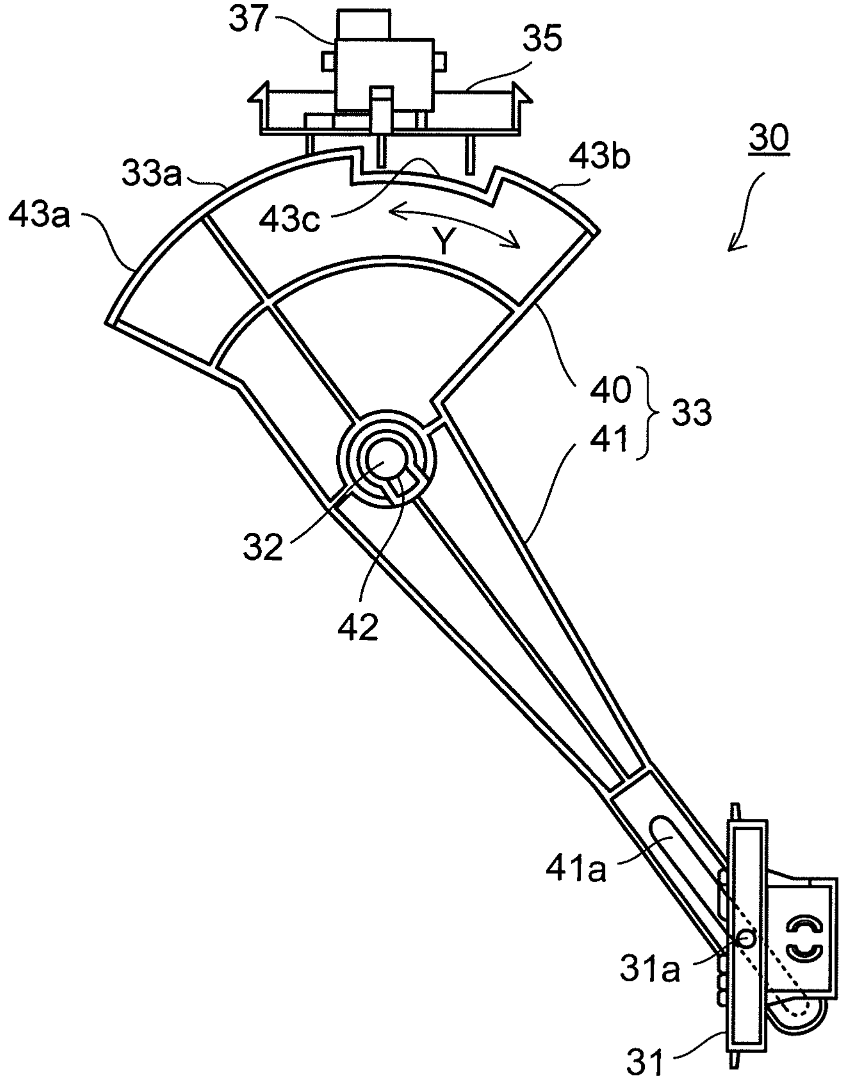
FIG. 3 is a plan view showing, on an enlarged scale, a paper size detecting mechanism according to the present invention.

FIG. 3 is a plan view showing, on an enlarged scale, the paper size detecting mechanism 30. The following member 33 has an arc-shaped portion 40 and a following arm portion 41, and is arranged on the underside of the paper feed cassette 10. The following member 33 has its swing center 32 at the pivot of the fan defined by the arc-shaped portion 40, and is swingably fitted to the paper feed cassette 10 on a shaft member 42. With respect to the swing center 32, the following arm portion 41 extends away from the arc-shaped portion 40.

At the outer circumferential portion 33*a* of the arc-shaped portion 40, a pair of radially protruding protrusions 43*a* and 43*b* are formed, with a recess 43*c* between them. The positions of the protrusions 43*a* and 43*b* and the recess 43*c* are determined according to the relationship between the position, depending on paper size, of the trailing edge restricting member 31 on the paper feed cassette 10 and the detecting member 35 with which the protrusions 43*a* and/or 43*b* makes contact when the paper feed cassette 10 is loaded. The contact relationship between the protrusions 43*a* and 43*b* and the detecting member 35 will be described later.

In a tip-end portion of the following arm portion 41, a guide hole 41*a* is formed which has an elongate shape extending radially from the swing center 32. In the guide hole 41*a*, a rod 31*a* provided on the trailing edge restricting member 31 is movably fitted. Thus, by moving the trailing edge restricting member 31 between the position (position A in FIG. 2) corresponding to the smallest paper size and the position (position E in FIG. 2) corresponding to the largest paper size in accordance with the size of the paper 26 stacked on the paper feed cassette 10, since the rod 31*a* is fitted in the guide hole 41*a* in the following member 33, the following member 33 swings about the swing center 32 as indicated by arrow Y.

Specifically, as the trailing edge restricting member 31 is moved in the direction from position A to position E, the following member 33 swings clockwise; reversely, as the trailing edge restricting member 31 is moved in the direction from position E to position A, the following member 33 swings counter-clockwise.

Figure 4:
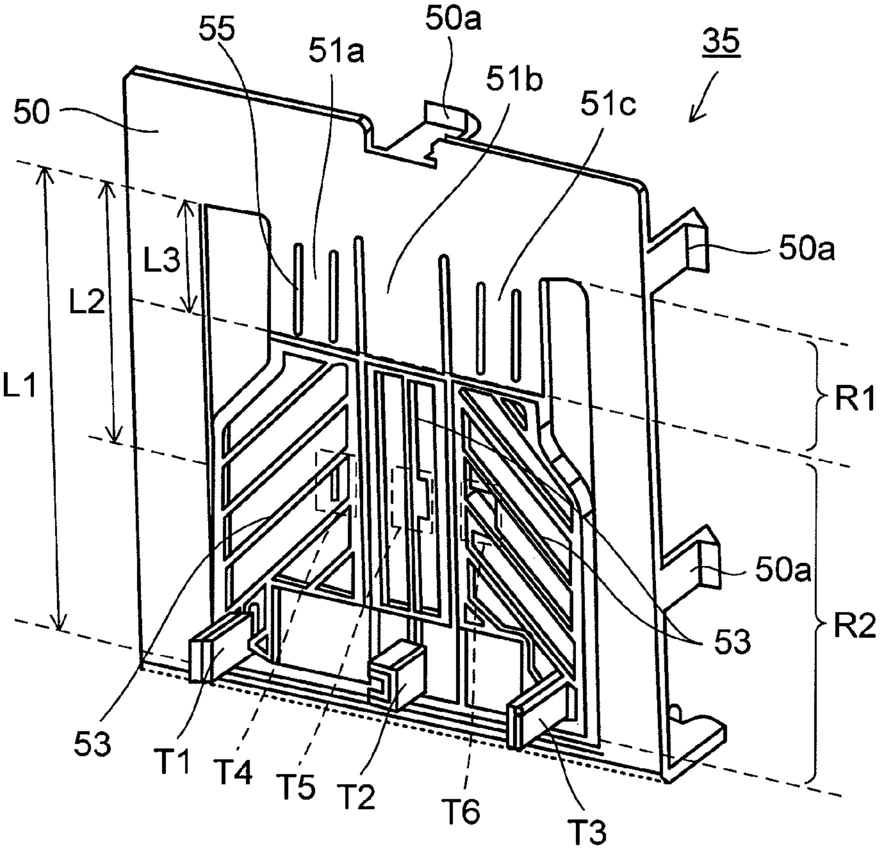
FIG. 4 is a perspective view of a detecting member used in a paper size detecting mechanism according to a first embodiment of the present invention, as seen from its side facing a following member.

FIG. 4 is a perspective view of the detecting member 35 used in the paper size detecting mechanism 30 according to a first embodiment of the present invention, as seen from its side facing the following member 33. The detecting member 35 is made of elastic plastic such as polyacetal (POM), and is formed as a substantially flat-plate-shaped single piece. The detecting member 35 has three detecting plates 51*a*, 51*b*, and 51*c*, each substantially rectangular plate-shaped, formed integrally with a flat-plate-shaped main portion 50 thereof which is arranged to face the loading direction X of the paper feed cassette 10.

The detecting plates 51*a* to 51*c* are, in upper-end portions thereof, integrally coupled to and supported on the main portion 50, are arranged side by side on the same plane as the main portion 50, and extend downward like cantilevers. The detecting plates 51*a* to 51*c* have, at a position a distance L1 away from their upper ends, projections T1, T2, and T3 formed respectively which project away from the loading direction X of the paper feed cassette 10.

Moreover, at a position a distance of L2 away from the upper ends of approximately one-half of the distance L1, on the reverse side of the faces where the projections T1, T2, and T3 are provided respectively, juts T4, T5, and T6 are formed respectively with which contacts S1 to S3 (see FIG. 5) of a multiple switch 37 are kept in contact. The juts T4, T5, and T6 are arranged at intervals matching the intervals between the contacts S1 to S3, that is, at intervals smaller than the intervals between the projections T1 to T3.

Moreover, in a region from the lower ends of the detecting plates 51*a* to 51*c* to a position a distance L3 away therefrom which is approximately one-half of the distance L2, ribs 53 are formed. In the following description, a region from the upper ends of the detecting plates 51*a* to 51*c* respectively to the position the distance L3 away therefrom is referred to as a base-end portion R1, and a region from that position the distance L3 away to the lower ends of the detecting plates 51*a* to 51*c* respectively is referred to as a swing portion R2.

The ribs 53 formed in the swing portions R2 of the detecting plates 51*a* and 51*c* are composed of frame portions which are formed to surround the swing portions R2, and diagonal portions of which a plurality are formed inside those the frame portions. The ribs 53 formed in the detecting plate 51*b* are composed of a frame portion which is formed to surround the swing portion R2 and a vertical portion which vertically divides the frame portion into two parts. Thus, the ribs 53 are formed so as to be continuous in the lengthwise direction of the swing portions R2 or overlap as seen from an end parallel to the lengthwise direction, and the swing portions R2 of the detecting plates 51*a* to 51*c* are thicker than their base-end portions R1 by the thickness of the ribs 53.

Moreover, in the base-end portions R1 of the detecting plates 51*a* and 51*c*, two slits 55 are formed. The detecting member 35 has a plurality of (five) hook-shaped fitting legs 50*a* formed integrally therewith, and is fitted in place with those fitting legs 50*a* fitted in fitting holes 61 (see FIG. 7) in the cabinet of the image forming apparatus 100.

Figure 5A:
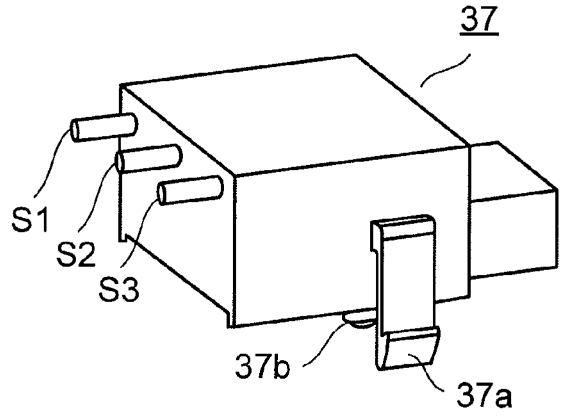
FIG. 5A is a perspective view of a multiple switch used in a paper size detecting mechanism according to the present invention.
Figure 5B:
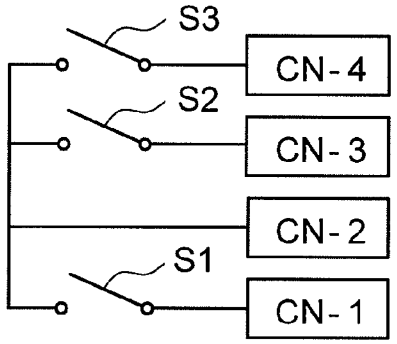
FIG. 5B is a simplified circuit diagram of a multiple switch.

FIG. 5A is a perspective view of the multiple switch 37, and FIG. 5B is a simplified circuit diagram of the multiple switch 37. The multiple switch 37 is an auto-recovery on/off switch provided with three contacts S1, S2, and S3. When any of the contacts S1, S2, and S3 is pressed, the corresponding switch is turned on; whenever a switch that has been turned on ceases to be pressed, it automatically returns to the off position. The contacts S1, S2, and S3 are arranged in a row, and with these contacts kept in contact with the juts T4 to T6 (see FIG. 4) on the detecting member 35, the multiple switch 37 is fitted, by means of a plurality of hook-shaped fitting legs 37*a* and positioning pins 37*b*, to the body of the image forming apparatus 100 (see FIG. 7).

When the contact 51 is pressed to the on position, an electrical signal is output via a connector CN-1. Likewise, when the contact S2 is pressed to the on position, an electrical signal is output via a connector CN-3, and when the contact S3 is pressed to the on position, an electrical signal is output via a connector CN-4. What is referred to as a multiple switch in the present specification is not limited to a single switch having a plurality of (here, three) contacts as shown in FIG. 5, but includes an array of a plurality of small switches arranged side by side and each having a single contact.

Figure 6:
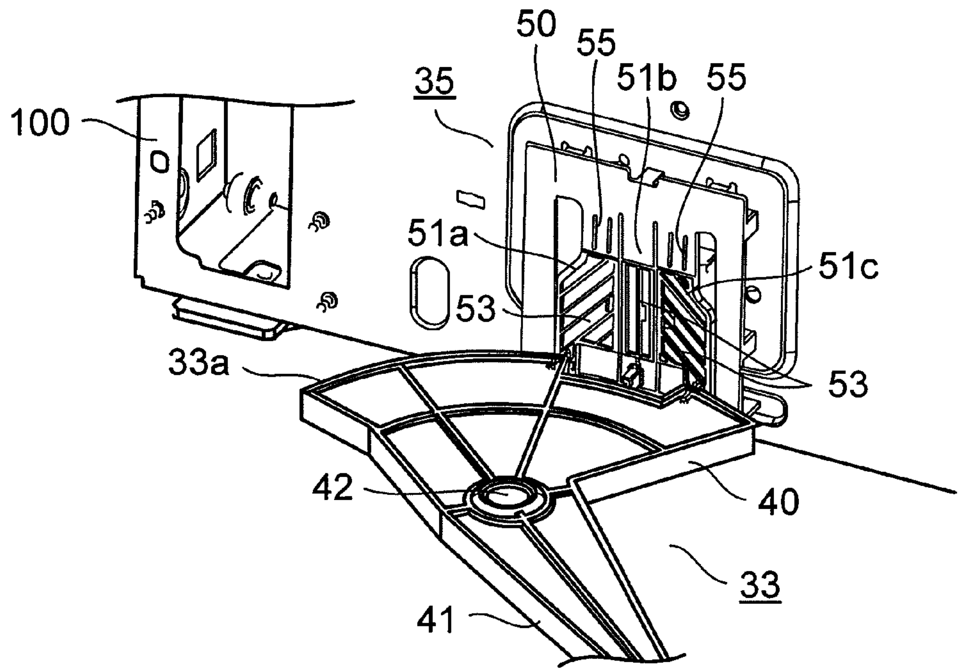
FIG. 6 is a perspective view showing a positional relationship between a detecting member, which is fitted in the cabinet of an image forming apparatus, and a following member in a paper size detecting mechanism according to the present invention, as seen from obliquely above.
Figure 7:
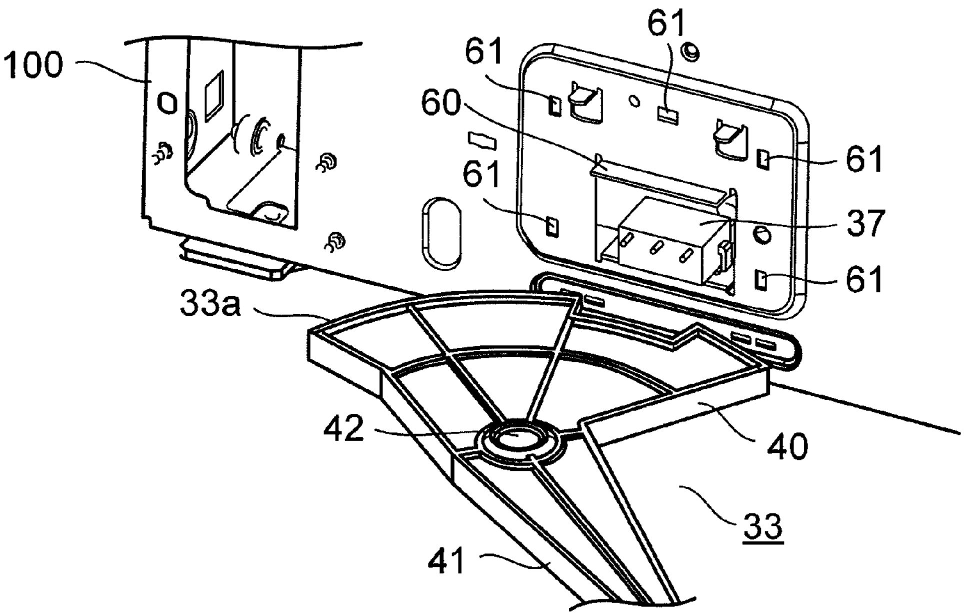
FIG. 7 is a perspective view showing, with the detecting member removed from what is shown in FIG. 6, a positional relationship between a multiple switch and the following member, as seen from obliquely above.

FIG. 6 is a perspective view showing the positional relationship between the detecting member 35, which is fitted to the cabinet of the image forming apparatus 100, and the following member 33, as seen from obliquely above. FIG. 7 is a perspective view showing, with the detecting member 35 removed from what is shown in FIG. 6, the positional relationship between the multiple switch 37 and the following member 33, as seen from obliquely above. Now, with reference to FIGS. 6 and 7 as well as, where necessary, FIGS. 4 and 5, a description will be given of the relationship between the pair of protrusions 43*a* and 43*b* on the following member 33, which is provided on the paper feed cassette 10, and the projections T1 to T3 on the detecting member 35, which is provided in the cabinet of the image forming apparatus 100, that is, the relationship between the following member 33, which moves in concert with the trailing edge restricting member 31 which moves in accordance with the size of paper 26 stacked in the paper feed cassette 10, and the multiple switch 37, which is operated by the detecting member 35.

In the cabinet of the image forming apparatus 100, to which the detecting member 35 is fitted, the multiple switch 37 is provided which has three contacts S1 to S3. Over the multiple switch 37, a prop 60 is horizontally provided which makes contact with the reverse side (the face where the juts T4 to T6 are formed) of the detecting member 35. The prop 60 is arranged to face a position on the detecting plates 51*a* to 51*c* slightly higher than the position of the distance L3.

When the paper feed cassette 10 is loaded into the cabinet of the image forming apparatus 100 and any of the detecting plates 51*a* to 51*c* deforms as a result of the corresponding one of the projections T1 to T3 being pressed by the protrusion 43*a* or 43*b* on the following member 33, the amount of deformation, that is, the movement stroke in the cassette loading direction X, is reduced to about one-half of L2/L1 and the result is transmitted via the juts T4 to T6 to the contacts S1 to S3 respectively.

FIGS. 8 to 12 are plan views showing the relationship between the following member 33 and the detecting member 35 for different paper sizes. Now, with reference to FIGS. 8 to 12 as well as, wherever necessary, FIGS. 2 to 7, a description will be given of a specific detection method adopted by the paper size detecting mechanism 30. FIGS. 8 to 12 all show a state immediately before contact is made, in the loading direction X of the paper feed cassette 10, between the protrusions 43*a* and 43*b* on the following member 33 and the projections T1 to T3 on the detecting member 35 opposite them respectively. Discussed here is an example in which the trailing edge restricting member 31 can be located at positions A, B, C, D, and E (see FIG. 2) between position A corresponding to the smallest paper size and position E corresponding to the largest paper size so that five different paper sizes can be handled.

Figure 8:
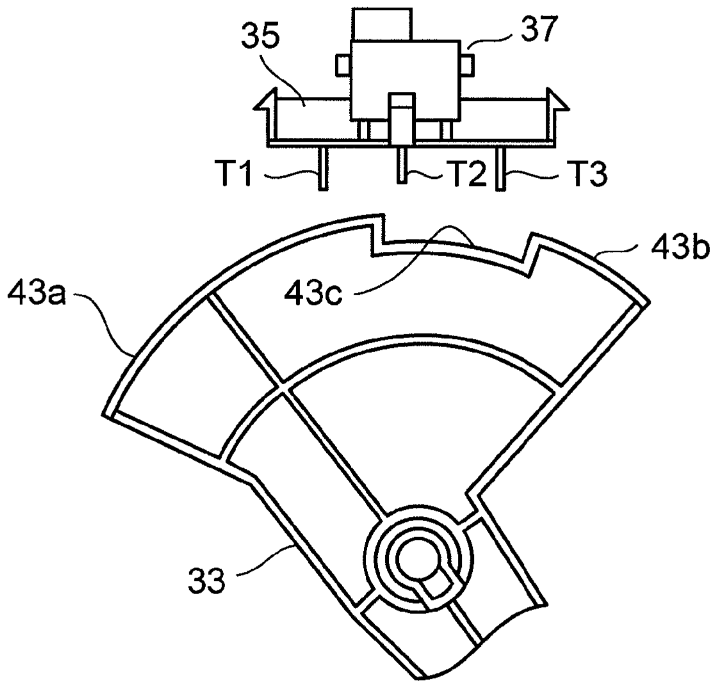
FIG. 8 is a plan view showing a relationship between protrusions 43*a* and 43*b* on an arc-shaped portion 33*a* of a following member 33 and projections T1 to T3 on a detecting member 35 when a trailing edge restricting member 31 is located at position A.

FIG. 8 shows the relationship between the protrusions 43*a* and 43*b* on the outer circumferential portion 33*a* of the following member 33 and the projections T1 to T3 on the detecting member 35 as observed when the trailing edge restricting member 31 is located at position A. As shown in FIG. 8, with the trailing edge restricting member 31 at position A, the protrusion 43*a* is so located as to make contact with the projection T1, and the projections T2 and T3 are located in the recess 43*c*. Thus, in the detecting member 35, only the detecting plate 51*a* bends to cause the jut T4 to make contact with the contact S1. Thus, in the multiple switch 37, only the contact S1 moves to the on position, outputting an electrical signal via the connector CN-1.

Figure 9:
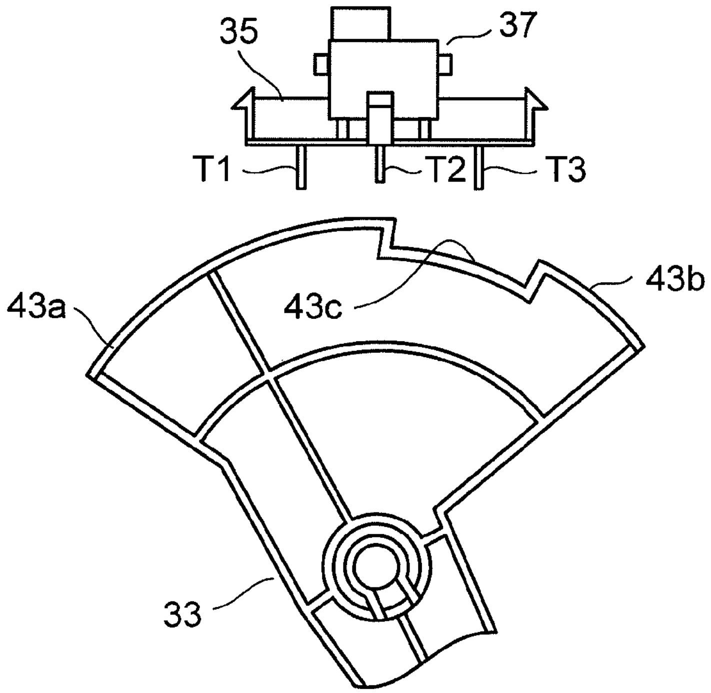
FIG. 9 is a plan view showing a relationship between protrusions 43*a* and 43*b* on an arc-shaped portion 33*a* of a following member 33 and projections T1 to T3 on a detecting member 35 when a trailing edge restricting member 31 is located at position B.

FIG. 9 shows the relationship between the protrusions 43*a* and 43*b* on the outer circumferential portion 33*a* of the following member 33 and the projections T1 to T3 on the detecting member 35 as observed when the trailing edge restricting member 31 is located at position B. As shown in FIG. 9, with the trailing edge restricting member 31 at position B, the protrusion 43*a* is so located as to make contact with the projections T1 and T2, and the projection T3 is located in the recess 43*c*. Thus, in the detecting member 35, the detecting plates 51*a* and 51*b* bend to cause the juts T4 and T5 to make contact with the contacts S1 and S2. Thus, in the multiple switch 37, the contacts S1 and S2 move to the on position, outputting electrical signals via the connectors CN-1 and CN-3.

Figure 10:
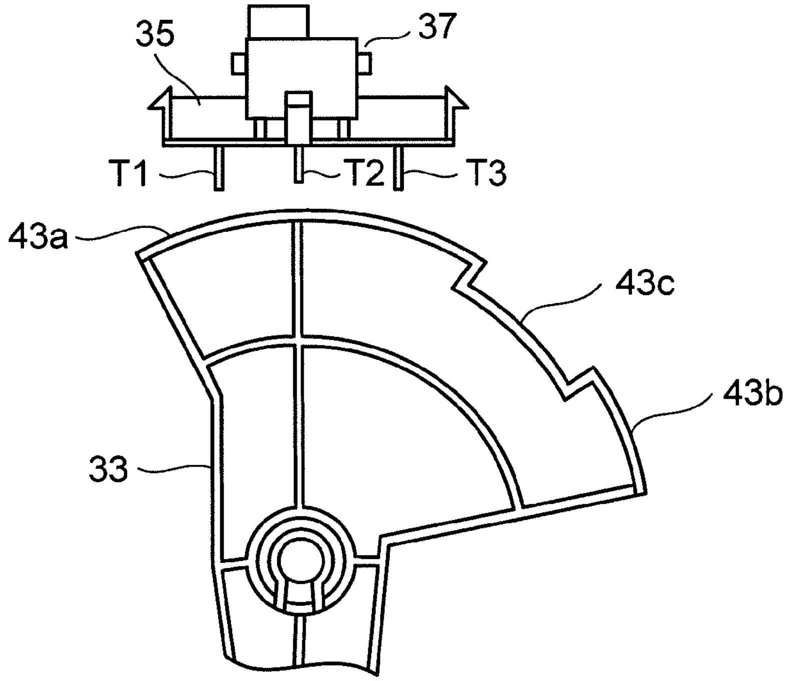
FIG. 10 is a plan view showing a relationship between protrusions 43*a* and 43*b* on an arc-shaped portion 33*a* of a following member 33 and projections T1 to T3 on a detecting member 35 when a trailing edge restricting member 31 is located at position C.

FIG. 10 shows the relationship between the protrusions 43*a* and 43*b* on the outer circumferential portion 33*a* of the following member 33 and the projections T1 to T3 on the detecting member 35 as observed when the trailing edge restricting member 31 is located at position C. As shown in FIG. 10, with the trailing edge restricting member 31 at position C, the protrusion 43*a* is so located as to make contact with the projections T1 to T3. Thus, in the detecting member 35, the detecting plates 51*a* to 51*c* bend to cause the juts T4, T5, and T6 to make contact with the contacts S1, S2, and S3. Thus, in the multiple switch 37, the contacts S1, S2, and S3 move to the on position, outputting electrical signals via the connectors CN-1, CN-3, and CN-4.

Figure 11:
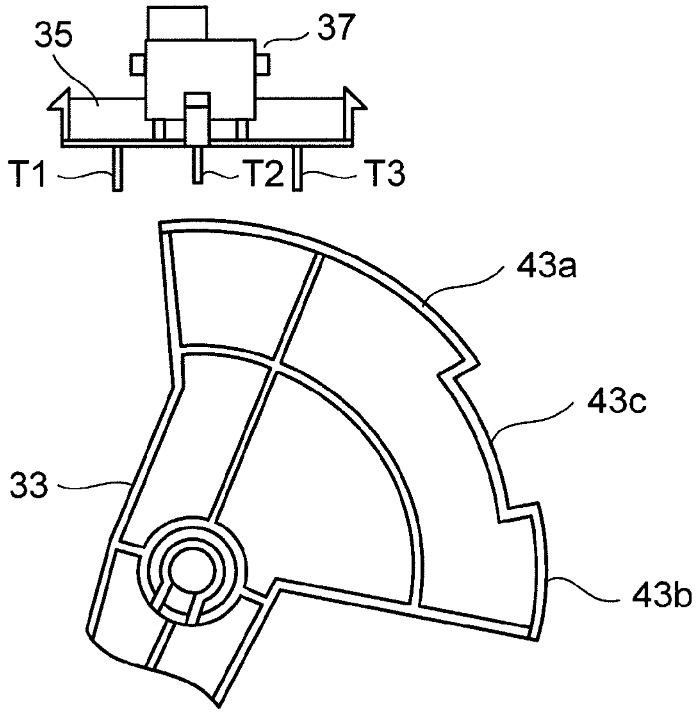
FIG. 11 is a plan view showing a relationship between protrusions 43*a* and 43*b* on an arc-shaped portion 33*a* of a following member 33 and projections T1 to T3 on a detecting member 35 when a trailing edge restricting member 31 is located at position D.

FIG. 11 shows the relationship between the protrusions 43*a* and 43*b* on the outer circumferential portion 33*a* of the following member 33 and the projections T1 to T3 on the detecting member 35 as observed when the trailing edge restricting member 31 is located at position D. As shown in FIG. 11, with the trailing edge restricting member 31 at position D, the protrusion 43*a* is so located as to make contact with the projections T2 and T3. Thus, in the detecting member 35, the detecting plates 51*b* and 51*c* bend to cause the juts T5 and T6 to make contact with the contacts S2 and S3. Thus, in the multiple switch 37, the contacts S2 and S3 move to the on position, outputting electrical signals via the connectors CN-3 and CN-4.

Figure 12:
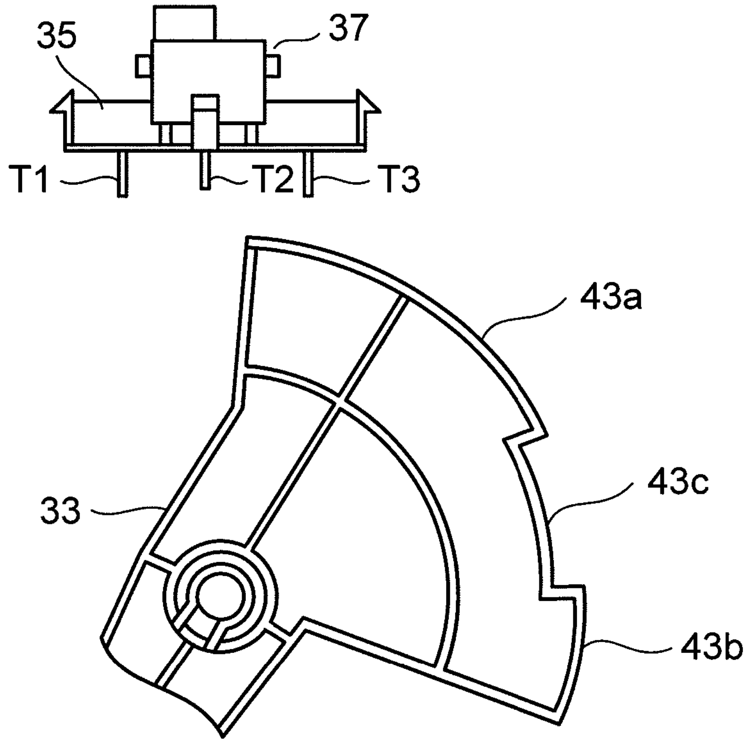
FIG. 12 is a plan view showing a relationship between protrusions 43*a* and 43*b* on an arc-shaped portion 33*a* of a following member 33 and projections T1 to T3 on a detecting member 35 when a trailing edge restricting member 31 is located at position E.

FIG. 12 shows the relationship between the protrusions 43*a* and 43*b* on the outer circumferential portion 33*a* of the following member 33 and the projections T1 to T3 on the detecting member 35 as observed when the trailing edge restricting member 31 is located at position E. As shown in FIG. 12, with the trailing edge restricting member 31 at position E, the protrusion 43*a* is so located as to make contact with the projection T3. Thus, in the detecting member 35, only the detecting plate 51*c* bends to cause the jut T6 to make contact with the contact S3. Thus, in the multiple switch 37, only the contact S3 moves to the on position, outputting an electrical signal via the connector CN-4.

Though not illustrated, in a case where a paper size smaller than that handled with the trailing edge restricting member 31 at position A is handled, the protrusions 43*a* and 43*b* are swung further counter-clockwise from their positions in FIG. 8, where the trailing edge restricting member 31 is at position A, so as to make contact with the projections T1 and T3, and the projection T2 is located in the recess 43*c*. In this case, in the detecting member 35, the detecting plates 51*a* and 51*c* bend to cause the juts T4 and T6 to make contact with the contacts S1 and S3, and thus, in the multiple switch 37, the contacts S1 and S3 move to the on position, outputting electrical signals via the connectors CN-1 and CN-4.

Likewise, in a case where a paper size larger than that handled with the trailing edge restricting member 31 at position E is handled, the protrusions 43*a* and 43*b* are swung further clockwise from their positions in FIG. 12, where the trailing edge restricting member 31 is at position E, so as to make contact with none of the projections T1, T2, and T3. In this case, in the multiple switch 37, the contacts S1, S2, and S3 all remain in the off position, and therefore no electrical signal is output via any of the connectors CN-1, CN-3, and CN-4.

As described above, different paper sizes cause the trailing edge restricting member 31 to be located at different positions, and thereby cause the multiple switch 37 to output electric signals in different combinations. These electric signals from the connectors CN-1, CN-3, and CN-4 of the multiple switch 37 are fed to a controller (not illustrated) provided in the image forming apparatus 100 so that, by reading the combination of the electrical signals, the size of the paper in the paper feed cassette 10 is detected.

In this way, by use of a compact, inexpensive single multiple switch instead of a plurality of independent switches as conventionally used, by use of a following member 33 using no gears instead of a segment gear, an idle gear, a rack, etc. as conventionally used, and by use of a detecting member 35 made of an elastic material, it is possible to simplify the mechanism. It is also possible to achieve space saving. In particular, providing the detecting member 35 with detecting plates 51*a* to 51*c* formed as plate-shaped members like cantilevers makes it possible to read the loading stroke of the paper feed cassette 10 in smaller detection steps, and this helps make the multiple switch 37 compact. By use of the following member 33 using no gears and the multiple switch 37 that is inexpensive and can be made compact, it is possible to make the paper size detecting mechanism less costly.

In the first embodiment, the paper size detecting mechanism 30 is characterized in that slits 55 are formed in the base-end portions R1—which make contact with the prop 60—of the detecting plates 51*a* to 51*c*—which move into and out of contact with the contact S1 to S3, respectively, of the multiple switch 37—of the detecting member 35, and that ribs 53 are formed in the swing portions R2—which are located downward of the base-end portions R1—of the detecting plates 51*a* to 51*c*.

In the construction according to the first embodiment, the swing portions R2—on which the projections T1 to T3 and the juts T4 to T6 are formed—have parts thereof formed, with ribs 53, into thicker portions which are continuous in the lengthwise direction or overlap as seen from an end parallel to the lengthwise direction. This gives the swing portions R2 increased rigidity and makes them less easy to deform elastically. Consequently, the deformation of the detecting plates 51*a* to 51*c* resulting from contact with the protrusions 43*a* and 43*b* on the following member 33 concentrates in the base-end portions R1, and this makes the swing portions R2 less likely to undergo creep deformation.

On the other hand, the slits 55 reduce the rigidity of the base-end portions R1, and make their elastically deformable range wider (make them easier to elastically deform) than that of the swing portions R2. Even so, since their deformation is restricted by contact with the prop 60, the base-end portions R1 are unlikely to undergo creep deformation beyond the limit within which it can restore from elastic deformation. Moreover, owing to the reduced rigidity of the base-end portions R1, even when the base-end portions R1 undergo creep deformation, the detecting plates 51*a* to 51*c* return to their positions before contact under the restoring force of the contacts S1 to S3 of the multiple switch 37. Thus, it is possible, with a simple construction, to make the elastically deformable range of the base-end portions R1 wider than that of the swing portions R2. This improves the response of the detecting plates 51*a* to 51*c* to the movement of the protrusions 43*a* and 43*b* into and out of contact with them, and thus helps effectively prevent erroneous detection of paper size.

In general, with most materials, deforming them slightly (within the elastic range) does not disable them from restoring their original shape. Deformation within a range in which a material retains elasticity is called elastic deformation. When deformation goes out of that range, that is, beyond a certain limit (yield point), it no longer is in a range of elastic deformation but is in a range of creep deformation from where the original shape cannot be restored. In the present specification, "elastically deformable range" denotes the range of deformation between the original shape to the yield point.

Moreover, in the detecting plates 51*a* and 51*c*, giving the base-end portions R1 smaller widths than the swing portions R2 makes the base-end portions R1 easier to deform. Although, here, slits 55 are formed only in the base-end portions R1 of the detecting plates 51*a* and 51*c*, similar slits 55 may also be formed in the base-end portion R1 of the detecting plate 51*b*. Alternatively, ribs 53 and slits 55 may be formed only, of the detecting plates 51*a* to 51*c*, the one (for example, the detecting plate 51*a*) which is pressed by the outer circumferential portion 33*a* of the arc-shaped portion 40 when the following member 33 is located at the position corresponding to the most frequently used paper size. Moreover, forming a plurality of slits 55 parallel to the lengthwise direction of the detecting plates 51*a* and 51*c*, as compared with forming slits perpendicularly to the lengthwise direction, helps effectively reduce the rigidity of the swing portions R2 while maintaining the durability of the base-end portions R1.

Figure 13:
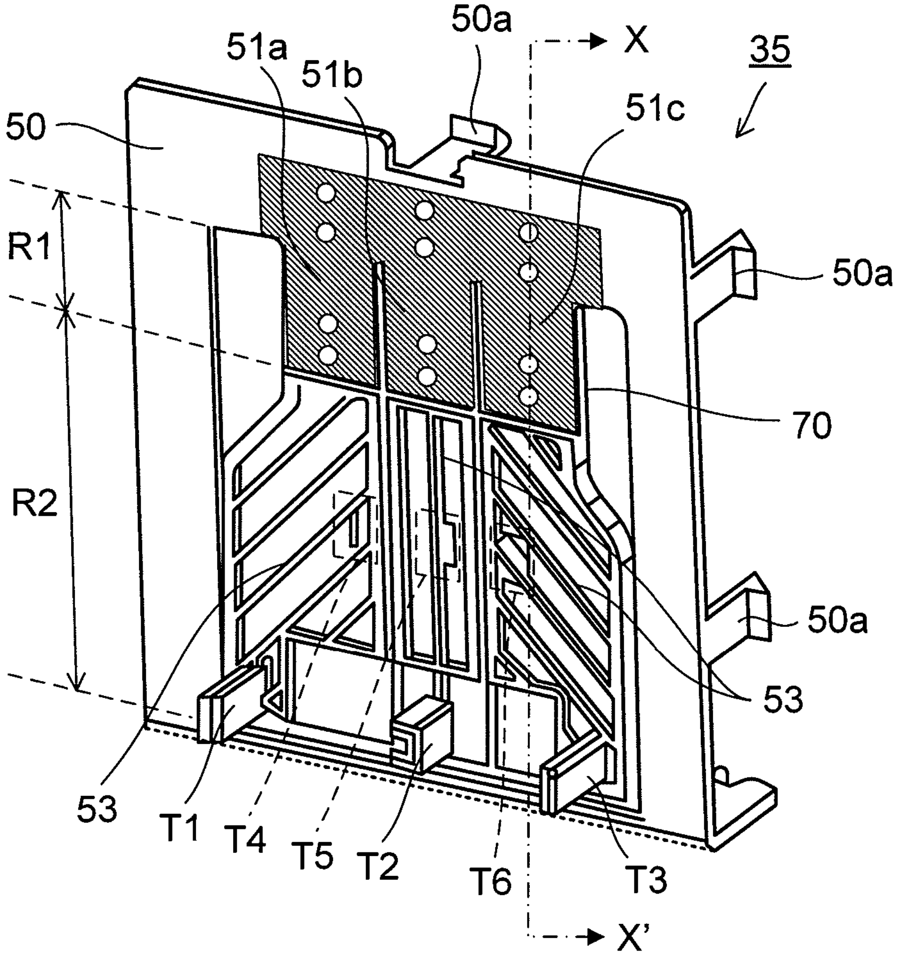
FIG. 13 is a perspective view of a detecting member used in a paper size detecting mechanism according to a second embodiment of the present invention, as seen from its side facing a following member.
Figure 14:
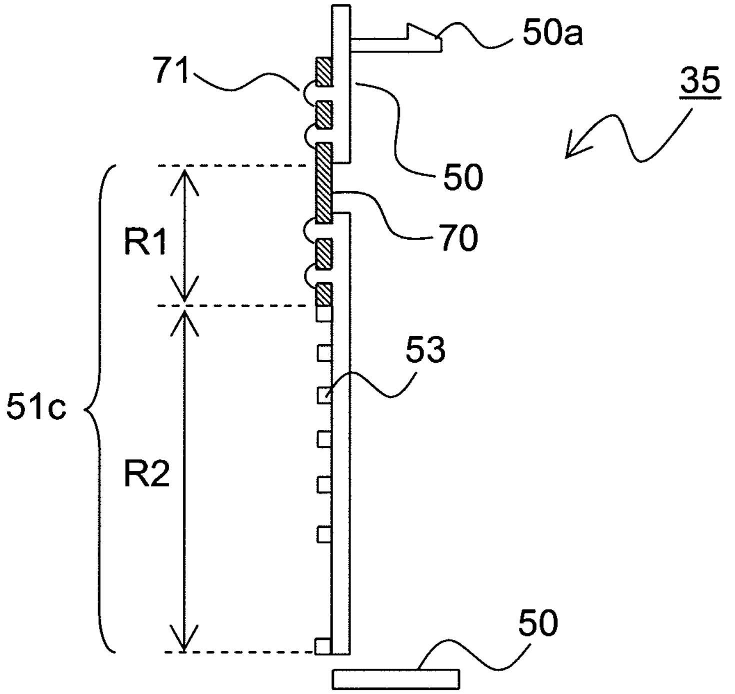
FIG. 14 is a vertical sectional view of a detecting member used in a paper size detecting mechanism according to the second embodiment.

FIG. 13 is a perspective view of the detecting member 35 used in the paper size detecting mechanism 30 according to a second embodiment of the present invention, as seen from its side facing the following member 33. FIG. 14 is a vertical sectional view of the detecting member 35 used in the second embodiment. In the detecting member 35 used in this embodiment, the base-end portions R1 of the detecting plates 51*a*, 51*b*, and 51*c* are formed of an elastic sheet of metal 70, and couples between the main portion 50 and the swing portions R2, which are molded of resin such as polyacetal (POM).

The sheet of metal 70 has a plurality of through holes formed therein; bosses 53 formed on the main portion 50 and the swing portions R2 are put through those through holes and formed into fused portions 71, so that the base-end portions R1 and the main portion 50, and also the base-end portions R1 and the swing portions R2, are fixed together. As in the first embodiment, ribs 53 are formed in the swing portions R2. The structures of the components other than the paper size detecting mechanism, such as the following member 33 and the multiple switch 37, and the relationship between the following member 33 and the detecting member 35 to handle different paper sizes, are similar to those in first embodiment, and therefore no overlapping description will be repeated.

In the paper size detecting mechanism 30 according to the second embodiment, forming the base-end portions R1 out of an elastic sheet of metal 70 makes the elastically deformable range of the base-end portions R1 wider than that of the swing portion R2, and also increases the strength of the base-end portions R1 against heat creep and their fatigue limit against repeated elastic deformation. Thus, it is possible to more effectively suppress creep deformation of the detecting plates 51*a* to 51*c* during transport or storage of the image forming apparatus 100 in high-temperature environments, and thereby to surely prevent erroneous detection of paper size. Suitable examples of the sheet of metal 70 of which the base-end portions R1 are formed include a sheet of stainless (SUS) with a high limit of elasticity and a sheet of stainless steel for springs (SUS304CSP).

Instead of putting the bosses 53 on the main portion 50 and the swing portions R2 through the through holes in the base-end portions R1 and forming them into the fused portions 71, it is possible, when the main portion 50 and the swing portions R2, which are formed of resin, are molded, to place a sheet of metal 70 to serve as the base-end portions R1 inside the mold and form, at the same time that the main portion 50 and the swing portion R2 are molded, the fused portions 71, so as to thereby form the base-end portions R1 integrally with the main portion 50 and the swing portions R2. This helps reduce the number of steps to produce the detecting member 35. On the other hand, fusing and fixing the base-end portions R1 to the main portion 50 and the swing portions R2 after the molding of the main portion 50 and the swing portions R2, which are made of resin, helps simplify the structure of the mold used to mold the main portion 50 and the swing portion R2.

Although, here, the base-end portions R1 of the detecting plates 51*a* to 51*c* are all formed of a sheet of metal 70, it is possible to form, out of a sheet of metal 70, not all of the detecting plates 51*a* to 51*c* but only the one (for example, the detecting plate 51*a*) which is pressed by the outer circumferential portion 33*a* of the arc-shaped portion 40 when the following member 33 is located at the position corresponding to the most frequently used paper size.

It should be understood that the present invention is not limited by the embodiments specifically described above, and that many variations and modifications are possible without departing from the spirit of the present invention. For example, although, in the embodiments described above, two protrusions 43*a* and 43*b* are provided in the outer circumferential portion 33*a* of the following member 33, any number of, namely one or two or more, protrusions may be provided depending on the number of different paper sizes to be detected.

Although, in the first embodiment described above, ribs 53 are formed on the swing portions R2 to increase the rigidity of the swing portions R2, instead, for example, part or the whole of the swing portions R2 may be made thicker than the base-end portions R1 continuously in the lengthwise direction or so as to overlap in the direction perpendicular to the lengthwise direction, in order to increase the rigidity of the swing portions R2. Forming a rib-like thicker portion as in the first embodiment, as compared with making the entire swing portions R2 thicker, helps reduce the amount of resin constituting the detecting member 35.

Although, in the embodiments described above, an auto-recovery multiple switch 37 is used, it is also possible to couple the contacts S1 to S3 of the multiple switch 37 to the detecting plates 51*a* to 51*c* of the detecting member 35 by an appropriate means and use a simpler switch of a non-auto-recovery type.

An embodiment of the present invention can be used in a paper size detecting mechanism mounted on a paper feed cassette unloadably loaded in an image forming apparatus. By use of the present invention, it is possible to realize, easily and inexpensively, a paper size detecting mechanism that can effectively prevent erroneous detection of paper size due to creep deformation of a detecting member.

What is claimed is:

1. A paper size detecting mechanism, comprising:

a restricting member which is reciprocably provided on an inside of a bottom of a paper feed cassette unloadably loaded in a cabinet of an image forming apparatus and which restricts an edge of paper accommodated in the paper feed cassette;

a following member including a following arm portion of which one end is coupled to the restricting member and an arc-shaped portion which is continuous with another end of the following arm portion and which has formed thereon at least one protrusion protruding in a radial direction, the following member being provided swingable in concert with movement of the restricting member;

a detecting member which is arranged in the cabinet of the image forming apparatus at a position facing the arc-shaped portion and which has a plurality of detecting plates elastically deformable by contact with the protrusion, the detecting plates each including a base-end portion of which one end is supported on a main portion of the detecting member and a swing portion which is located on a tip-end side of the base-end portion and with which the protrusion makes contact, the base-end portion in at least one of the detecting plates having a wider elastically deformable range than the swing portion;

a multiple switch which is provided on a rear side of the detecting member and which has a plurality of contacts switchable between an on state and an off state by elastic deformation of the plurality of detecting plates; and a prop which is provided horizontally over the multiple switch and which is kept in contact with a reverse side of the detecting plates, at the base-end portion thereof, to serve as a fulcrum of swinging, the paper size detecting mechanism detecting size of the paper accommodated in the paper feed cassette.

2. The paper size detecting mechanism according to claim 1, wherein at least one of the detecting plates has a slit formed in the base-end portion and has a thicker portion formed in the swing portion.

3. The paper size detecting mechanism according to claim 2, wherein the slit comprises a plurality of slits formed parallel to a lengthwise direction of the detecting plates.

4. The paper size detecting mechanism according to claim 2, wherein the thicker portion is formed in a shape of a rib.

5. The paper size detecting mechanism according to claim 4, wherein the thicker portion comprises a rib continuous in a lengthwise direction of the swing portion or a plurality of ribs overlapping as seen from an end parallel to the lengthwise direction.

6. The paper size detecting mechanism according to claim 1, wherein at least one of the detecting plates has the base-end portion formed of an elastic sheet of metal.

7. The paper size detecting mechanism according to claim 6, wherein the main portion of the detecting member and the swing portion are formed of resin, and the base-end portion is fixed between the main portion of the detecting member and the swing portion simultaneously when the main portion of the detecting member and the swing portion are molded.

8. The paper size detecting mechanism according to claim 6, wherein the main portion of the detecting member and the swing portion are formed of resin, and the base-end portion is fixed by fusion between the main portion of the detecting member and the swing portion after the main portion of the detecting member and the swing portion are molded.

9. The paper size detecting mechanism according to claim 1, wherein at least one of the detecting plates has the base-end portion formed with a smaller width than the swing portion.

10. The paper size detecting mechanism according to claim 1, wherein the detecting plate in which the base-end portion has a wider elastically deformable range than the swing portion makes contact with the protrusion on the arc-shaped portion when the following member is at a position corresponding to arrangement of the restricting member for restricting an edge of paper of a most frequently used size.

11. An image forming apparatus comprising the paper size detecting mechanism according to claim 1.

* * * * *